(12) United States Patent
Farkash

(10) Patent No.: US 8,644,377 B2
(45) Date of Patent: Feb. 4, 2014

(54) SYSTEM AND METHOD FOR EMBEDDING DATA IN VIDEO

(75) Inventor: Eyal Farkash, Raanana (IL)

(73) Assignee: Cisco Technology Inc., San Jose, CA (US)

( * ) Notice: Subject to any disclaimer, the term of this patent is extended or adjusted under 35 U.S.C. 154(b) by 547 days.

(21) Appl. No.: 12/736,473

(22) PCT Filed: Apr. 14, 2008

(86) PCT No.: PCT/IB2008/051411
§ 371 (c)(1),
(2), (4) Date: Nov. 4, 2010

(87) PCT Pub. No.: WO2009/127900
PCT Pub. Date: Oct. 22, 2009

(65) Prior Publication Data
US 2011/0050990 A1 Mar. 3, 2011

(51) Int. Cl.
*H04N 11/02* (2006.01)

(52) U.S. Cl.
USPC ............... 375/240.01; 375/240.28; 375/363

(58) Field of Classification Search
None
See application file for complete search history.

(56) References Cited

U.S. PATENT DOCUMENTS

| | | | |
|---|---|---|---|
| 4,644,399 A | 2/1987 | McCord et al. | |
| 4,783,699 A | 11/1988 | DePaul | |
| 5,636,292 A | 6/1997 | Rhoads | |
| 5,710,834 A | 1/1998 | Rhoads | |
| 5,745,604 A | 4/1998 | Rhoads | |
| 5,768,426 A | 6/1998 | Rhoads | |
| 5,832,119 A | 11/1998 | Rhoads | |
| 6,381,341 B1 | 4/2002 | Rhoads | |
| 6,404,898 B1 | 6/2002 | Rhoads | |
| 6,625,298 B1 * | 9/2003 | Maes et al. ............ | 382/100 |
| 6,721,440 B2 | 4/2004 | Reed et al. | |
| 6,760,463 B2 | 7/2004 | Rhoads | |
| 6,950,532 B1 | 9/2005 | Schumann et al. | |
| 7,020,304 B2 | 3/2006 | Alattar et al. | |
| 7,035,427 B2 | 4/2006 | Rhoads | |
| 7,058,697 B2 | 6/2006 | Rhoads | |
| 7,068,809 B2 | 6/2006 | Stach | |

(Continued)

FOREIGN PATENT DOCUMENTS

| | | |
|---|---|---|
| DE | 195 44 582 A1 | 6/1997 |
| GB | 613857 | 12/1946 |

(Continued)

OTHER PUBLICATIONS

Feb. 27, 2009 Transmittal of International Search Report and Written Opinion of International Searching Authority for captioned application.

(Continued)

*Primary Examiner* — Joseph Ustaris
*Assistant Examiner* — William Adrovel
(74) *Attorney, Agent, or Firm* — Husch Blackwell LLP

(57) ABSTRACT

Apparatus and method for embedding data in initial content having synchronized video and audio, the method comprising defining at least one content segment in the initial content, and altering the video and audio synchronization in the at least one segment in accordance with the data to be embedded, wherein the altered content segment is viewable on a viewing device and the synchronization alteration is imperceptible to a casual viewer. Related apparatus and methods are also described.

51 Claims, 8 Drawing Sheets

(56) References Cited

U.S. PATENT DOCUMENTS

| | | | |
|---|---|---|---|
| 2002/0027612 A1 | 3/2002 | Brill et al. | |
| 2005/0105726 A1* | 5/2005 | Neubauer et al. | 380/201 |
| 2007/0071037 A1 | 3/2007 | Abraham et al. | |
| 2008/0062315 A1* | 3/2008 | Oostveen et al. | 348/500 |
| 2008/0159403 A1* | 7/2008 | Dunning | 375/240.21 |

FOREIGN PATENT DOCUMENTS

| | | |
|---|---|---|
| JP | 11075055 A | 3/1999 |
| WO | WO 01/26376 A1 | 4/2001 |
| WO | WO 02/07362 A1 | 1/2002 |
| WO | WO 2005/011281 A1 | 2/2005 |
| WO | WO 2008/137093 A1 | 11/2008 |

OTHER PUBLICATIONS

Mauro Barni et al., "Digital Watermarking of Visual Data: State of the Art and New Trends" (Università di Sienna).

Mauro Barni et al., "Multichannel Watermarking of Color Images," *IEEE Transactions on Circuits and Systems for Video Technology* (vol. 12 No. 3 pp. 142-156, Mar. 2002).

Satoshi Kanai et al., "Digital Watermarking for 3D Polygons Using Multiresolution Wavelet Decomposition" (Hokkaido University, Japan), available at www.citeseer.ist.psu.edu/504450.html.

P.M. Kelly et al., "Candid: Comparison Algorithm for Navigating Digital Image Databases," *Proceedings of the Seventh International Working Conference on Scientific and Statistical Database Management* (pp. 252-258, 1994).

Deepa Kundur et al., "Video Fingerprinting and Encryption Principles for Digital Right Management" *Proceedings of the IEEE* (vol. 92. No. 6, pp. 918-932, Jun. 2004), (IEEE 2004).

Byron Reeves et al., "Effects of Audio-Video Asynchrony on Viewer's Memory, Evaluation of Content and Detection Ability" (Stanford University, Oct. 1993).

"ATSC Developing DTV Receiver Guidelines," *The Standard News From ATSC* (vol. 4, Issue 2, Jul 2003).

"ATSC Implementation Subcommittee Finding: Relative Timing of Sound and Vision for Broadcast Operations," (Advanced Television Systems Committee, Doc IS-191, Jun. 26, 2003).

"Information Technology—Coding of Audio-Visual Objects—Part 1, Systems" (ISO/IEC 14496-1—Second Edition Oct. 1, 2001) (ISO/IEC 2001).

"Information Technology—Coding of Moving Pictures and Associated Audio for Digital Storage Media at up to About 1, 5 Mbit/s—Part 1: Systems" (ISO/IEC 11172-1 First edition 1993-08:01) (ISO/IEC 1993).

"Information Technology—Generic Coding of Moving Pictures and Associated Audio information: Part 1. Systems" (BS EN ISO/IEC 13818-1:1997) (BSI 1997).

"Register Creative Works and control their use" (Audible Magic Corp. 2007).

"Technology" (Digimarc Corp. 2007).

Wikipedia—"Broadcast Television Systems," Available at http://en.wikipedia.org/wiki/Broadcast_television_systems.

Jul. 25, 2011 Office Communication in connection with prosecution of EP 08 737 835.2.

* cited by examiner

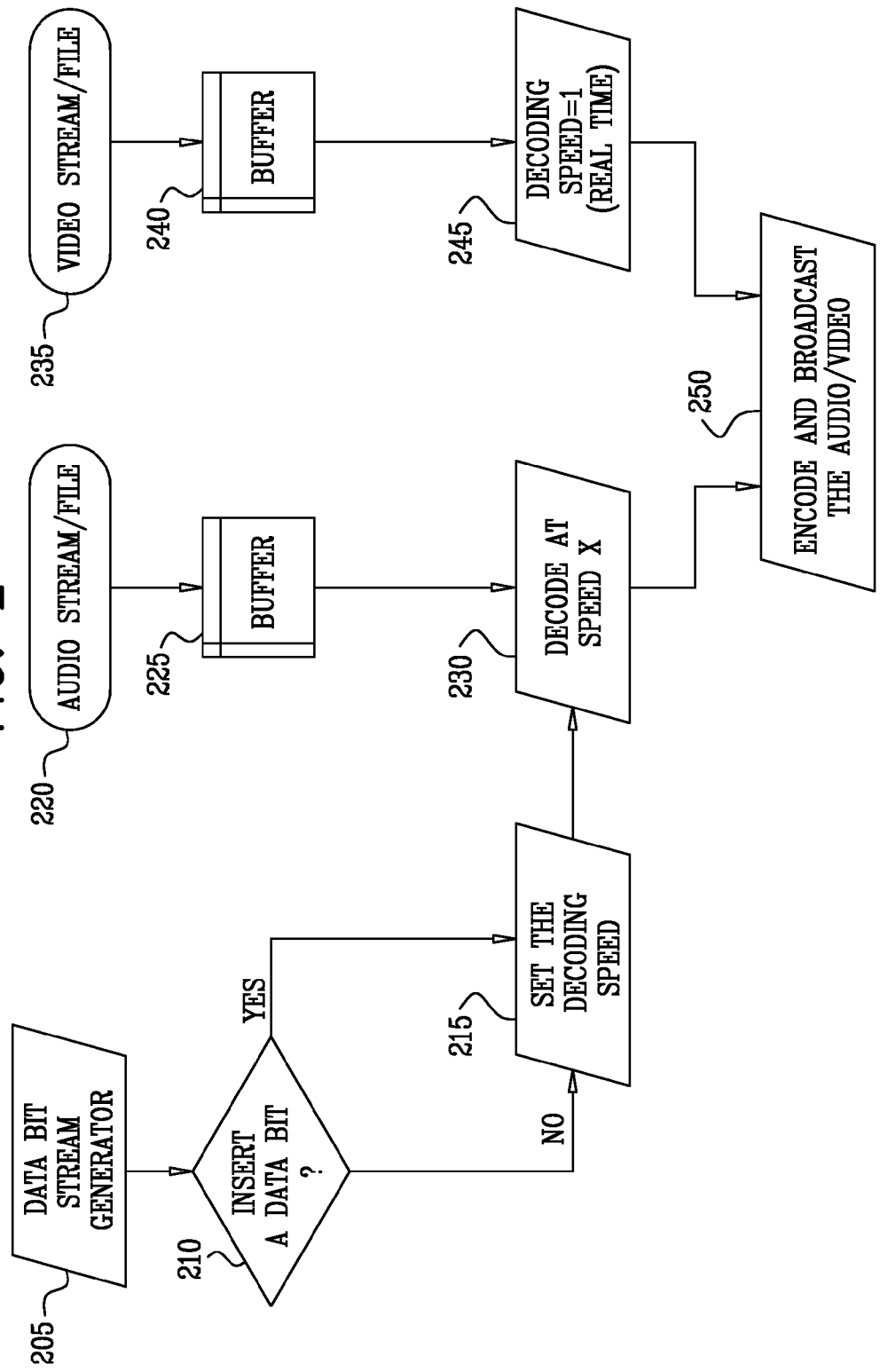

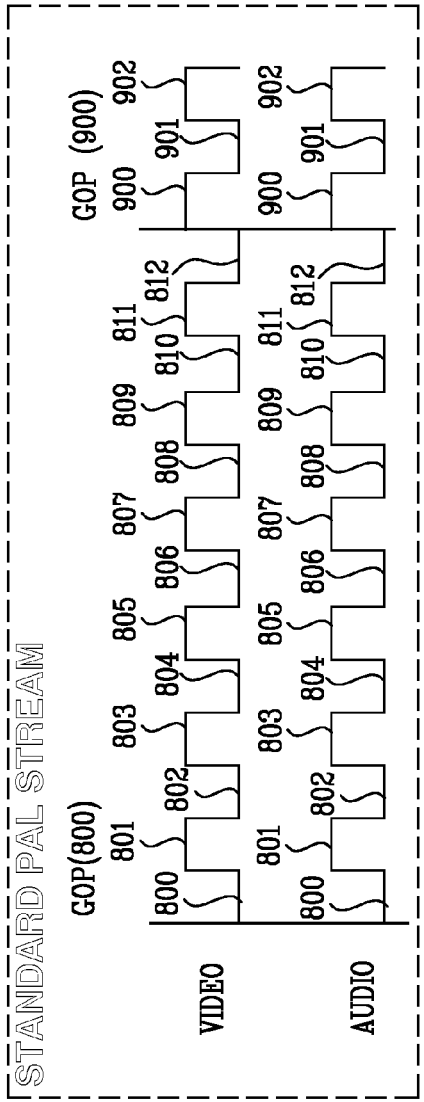
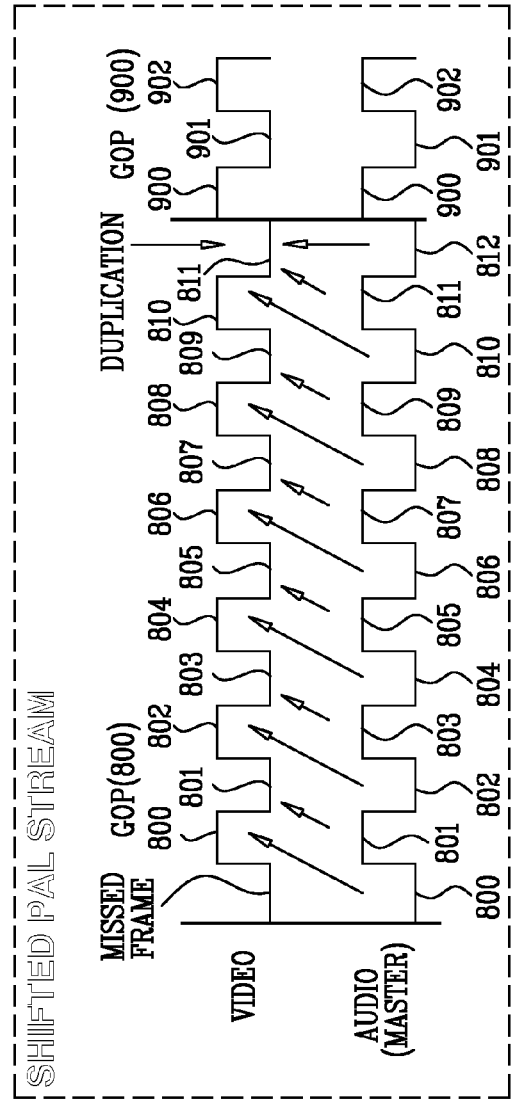

US 8,644,377 B2

SYSTEM AND METHOD FOR EMBEDDING DATA IN VIDEO

RELATED APPLICATION INFORMATION

The present application is a 35 USC §371 application of PCT/IB2008/051411, filed on 14 Apr. 2008 and entitled "SYSTEM AND METHOD FOR EMBEDDING DATA IN VIDEO", which was published on 22 Oct. 2009 in the English language with International Publication Number WO 2009/127900 A1.

FIELD OF THE INVENTION

The present invention relates to apparatus and methods for embedding data in video, and particularly, but not exclusively, to embedding data related to watermarking.

BACKGROUND OF THE INVENTION

With the recent advances in Internet content distribution, including peer-to-peer networks and real-time video streaming systems, unauthorized distribution of proprietary content has become rampant. The point of unauthorized distribution is often an authorized viewer, such as a viewer in a cinema where pirated copies are made with camcorders, or a viewer at home receiving a cable or satellite broadcast with a set-top-box TV decoder whose output is captured and re-encoded into a video file.

Although authorized broadcasts may be over channels generally considered secure, a content pirate could use a low cost video capture device, with analog or digital inputs, and a standard home PC, to capture, encode and upload pirated content over the internet to users not entitled to have access to the content. New encoding standards and broadband technologies have made this type of piracy even more attractive and easier to implement than ever before.

To assist in the prevention of unauthorized distribution of video content, it would be advantageous to be able to identify the point of unauthorized distribution of a video or the point at which a video was made available to an unauthorized distributor. After identification of the source, measures could be taken to prevent further unauthorized distribution. Such identification could be accomplished through the embedding of identifying information, related to the source, in the video content.

Embedding data in video is a rich field both in academic research and commercial inventions. An example of data embedding is watermarking. Covert watermarking in the compressed domain is well known in the art, as are overt watermarks that appear as bitmaps on top of displayed video, and steganographic watermarks.

Embedding data covertly in high-definition video is particularly difficult. This is generally because high-definition broadcasts and televisions for viewing them have such high resolution that they can cause watermarks that were intended to be covert, to be seen by the viewer, mainly as artifacts and noise. Not only would that annoy the average viewer, but it would also potentially expose the watermarks to attacks by pirates.

There are, basically, three television (TV) broadcast formats (PAL, SECAM and NTSC) in use today, each supporting various resolutions, phases and frame rates. Each half of a frame is called a field, and the rate at which fields are transmitted is one of the fundamental parameters of a video system. Usually, the rate is closely related to the frequency at which the electric power grid operates, to avoid the appearance of a flicker resulting from the beat between the television screen and nearby electric lights. Digital, or "fixed pixel", displays are generally progressive scan and must deinterlace an interlaced source.

In cinemas, 24 frames per second are projected at extremely high resolution, typically using 35 mm or 70 mm film. European TV generally broadcasts 25 frames per second (using 50 fields) and American and Far East TV generally broadcast 30 frames per second (using 60 fields). A casual human viewer is generally not sensitive to the differences between the various TV and cinema systems' frame rates.

In order to meet broadcast standards for TV, films made for cinematic presentation, which contain 24 frames per second, are typically converted to 25 or 30 frames per second, prior to broadcast, through the use of field duplication, speed-up, or 3:2 pull down, all techniques which are well known in the art. Some such frame rate conversions are performed utilizing telecine systems, also known as TK systems. Generally, when a film is encoded using 3:2 pull down, advanced codecs can identify the fields to be duplicated and tag them as such instead of encoding the same field twice. Later, prior to rendering, a decoder acts in the reverse manner and creates the duplicated field.

Digital TV and digital cinemas use separate video and audio streams, although both can be multiplexed into a single stream. At the time of presentation, a projecting device (decoder) synchronizes these streams in order to provide an enjoyable experience. This synchronization can be extremely accurate (within less than a frame), and exceeds a casual viewer's ability to distinguish an 'out of sync' scenario.

The following references are believed to reflect the present state of the art:
U.S. Pat. No. 6,760,463 to Rhoads;
U.S. Pat. No. 6,721,440 to Reed et al.;
U.S. Pat. No. 5,636,292 to Rhoads;
U.S. Pat. No. 5,768,426 to Rhoads;
U.S. Pat. No. 5,745,604 to Rhoads;
U.S. Pat. No. 6,404,898 to Rhoads;
U.S. Pat. No. 7,058,697 to Rhoads;
U.S. Pat. No. 5,832,119 to Rhoads;
U.S. Pat. No. 5,710,834 to Rhoads;
U.S. Pat. No. 7,020,304 to Alattar et al.;
U.S. Pat. No. 7,068,809 to Stach;
U.S. Pat. No. 6,381,341 to Rhoads;
U.S. Pat. No. 6,950,532 to Schumann, et al.;
U.S. Pat. No. 7,035,427 to Rhoads;
WO 02/07362 of Digimarc Corp.;
WO 05011281A1 of Koninklijke Philips Electronics N.V.;
US Patent Application 20020027612 of Brill, et al.;
US Patent Application 20070071037A1 of Abraham, et al.;
Patent Abstracts of Japan for JP11075055;
Digital Watermarking of Visual Data: State of the Art and New Trends, by M. Barni, F. Bartolini and A. Piva., Congrès Signal processing X: Theories and Applications (Tampere, 4-8 Sep. 2000), EUPSICO 2000: European Signal Processing Conference No 10, Tampere, Finland (Apr. 9, 2000);
Multichannel Watermarking of Color Images, by M. Barni, F. Bartolini and A. Piva., published in IEEE Transactions on Circuits and Systems for Video Technology, Vol. 12, No. 3, March 2002;
Digital Watermarking for 3D Polygons using Multiresolution Wavelet Decomposition, by Satoshi Kanai, Hiroaki Date, and Takeshi Kishinami, available on the World Wide Web at citeseer.ist.psu.edu/504450.html;

MPEG-1 standards document: BS EN ISO/IEC 11172-1: 1993 Information technology—Coding of moving pictures and associated audio for digital storage media at up to about 1.5 Mbit/s;

MPEG-2 standards document: BS EN ISO/IEC 13818-1: 1997 Information technology—Generic coding of moving pictures and associated audio information;

MPEG-4 standards document: BS EN ISO/IEC 14496-1: 2004—Information technology—Coding of audio-visual objects—Part 1: Systems;

CANDID: Comparison Algorithm for Navigating Digital Image Databases, Kelly, P. M. Cannon, T. M., Proceedings of the Seventh International Working Conference on Scientific and Statistical Database Management, 1994, pages 252-258;

Video Fingerprinting and Encryption Principles for Digital Rights Management, by D. Kundur and K. Karthik, Proceedings of the IEEE, Vol. 92, No. 6, June 2004; and http://en.wikipedia.org/wiki/Broadcast_television_systems.

SUMMARY OF THE INVENTION

The present invention seeks to provide an improved system and method for embedding data in initial content, the initial content comprising synchronized video and audio.

There is thus provided in accordance with an embodiment of the present invention a method for embedding data in initial content, the initial content comprising synchronized video and audio, the method comprising: defining at least one content segment in the initial content; and altering the video and audio synchronization in the at least one segment in accordance with the data to be embedded, thereby producing an altered content segment.

Further in accordance with an embodiment of the present invention said altering comprises altering the video and audio synchronization by a predetermined amount of time.

Still further in accordance with an embodiment of the present invention said defining comprises defining a plurality of content segments in the initial content and said method further comprises repeating said altering for at least an additional one of the plurality of initial content segments.

Additionally in accordance with an embodiment of the present invention the plurality of defined content segments are contiguous.

Moreover in accordance with an embodiment of the present invention the plurality of defined content segments are not contiguous.

Further in accordance with an embodiment of the present invention the not contiguous plurality of defined content segments are separated by predetermined intervals.

Still further in accordance with an embodiment of the present invention said altering comprises one of altering the video and audio synchronization by a first predetermined amount to embed a first data value in one of the plurality of defined content segments; and altering the video and audio synchronization by a second predetermined amount to embed a second data value in one of the plurality of defined content segments.

Additionally in accordance with an embodiment of the present invention the first data value is a zero and the second data value is a one.

Moreover in accordance with an embodiment of the present invention one of the first and second predetermined amounts is zero.

Further in accordance with an embodiment of the present invention the altered video and audio synchronization is reset in at least one predetermined location in the at least one altered content segment.

Still further in accordance with an embodiment of the present invention the at least one predetermined location comprises at least one of the beginning or the end of a group of pictures (GOP).

Additionally in accordance with an embodiment of the present invention the at least one predetermined location comprises at least one of the beginning or the end of the defined content segment.

Moreover in accordance with an embodiment of the present invention said altering the video and audio synchronization comprises at least one of: advancing the audio relative to the video; advancing the video relative to the audio; delaying the audio relative to the video; and delaying the video relative to the audio.

Further in accordance with an embodiment of the present invention the initial content comprises video and audio time stamps, and altering the video and audio synchronization comprises at least one of: altering an audio time stamp; and altering a video time stamp.

Still further in accordance with an embodiment of the present invention the initial content comprises audio frames and video frames, and said altering the video and audio synchronization comprises at least one of: dropping an audio frame; dropping a video frame; substituting an audio frame with an alternative audio frame; substituting a video frame with an alternative video frame; adding an audio frame; and adding a video frame. Additionally in accordance with an embodiment of the present invention said adding an audio frame comprises adding an audio frame that is a duplicate of an adjacent audio frame, and said adding a video frame comprises adding a video frame that is a duplicate of an adjacent video frame.

Moreover in accordance with an embodiment of the present invention the alternative audio frame comprises a duplicate of an adjacent audio frame, and the alternative video frame comprises a duplicate of an adjacent video frame.

Further in accordance with an embodiment of the present invention the initial content comprises non-compressed content.

Still further in accordance with an embodiment of the present invention the initial content comprises compressed content. Additionally in accordance with an embodiment of the present invention the compressed content comprises content encoded according to one of the following encoding standards: MPEG-1; MPEG-2; MPEG-4; VC-1; H.263; and H.264.

Moreover in accordance with an embodiment of the present invention the method further comprising rendering the altered content for viewing.

Further in accordance with an embodiment of the present invention the method further comprising transmitting the altered content.

Still further in accordance with an embodiment of the present invention the transmitting comprises broadcasting the altered content to at least one consumer.

Moreover in accordance with an embodiment of the present invention the transmitting comprises broadcasting the altered content to at least one distributor.

Further in accordance with an embodiment of the present invention the method further comprising recording the altered content on a physical medium.

Still further in accordance with an embodiment of the present invention the method is carried out at a location of the viewer.

Still further in accordance with an embodiment of the present invention the method is carried out by at least one of: a set top box, a personal computer, a television, a video projection system, and a player of recorded media.

Moreover in accordance with an embodiment of the present invention the data comprises a watermark.

Moreover in accordance with an embodiment of the present invention the data comprises information relating to at least one of: a content producer, a content owner, a content distributor, geographic location, a date, a time, subscription related information, geographic targeting of the content, a Consumer Premises Equipment (CPE) serial number, a CPE user Identification (ID), a smartcard serial number, a smartcard user ID, a subscriber ID, a customer ID, and subscriber information.

There is also provided in accordance with still another embodiment of the present invention a method for retrieving data from subject content, the subject content comprising Content Containing Embedded Data (CCED) comprising data embedded in initial content, the method comprising: sampling at a known location in the subject content, thereby producing a subject content sample; sampling at a location in the initial content corresponding to the known location in the subject content, thereby producing a corresponding initial content sample; comparing the subject content sample to the corresponding initial content sample; and detecting, based at least partially on said comparing, audio and video synchronization changes in the subject content relative to the initial content, wherein said changes signify an embedded data value.

Further in accordance with an embodiment of the present invention said sampling is repeatedly performed at predetermined intervals.

Still further in accordance with an embodiment of the present invention said sampling is repeatedly performed at predetermined variable intervals.

Additionally in accordance with an embodiment of the present invention the sampling interval is an integer multiple of one of 12, 15, and 25 times per second.

Moreover in accordance with an embodiment of the present invention, said method further comprising: determining at least one interval between a later detected change and an earlier detected change; disregarding at least one of the earlier detected change and the later detected change when the determined at least one interval is not equal to an expected interval.

Further in accordance with an embodiment of the present invention the expected interval is predeterminedly variable.

Still further in accordance with an embodiment of the present invention the expected interval is fixed.

There is also provided in accordance with still another embodiment of the present invention, a method for retrieving data embedded in subject content, the subject content comprising Content Containing Embedded Data (CCED), the method comprising: sampling the subject content at least twice, the at least two samples comprising a sample set; and detecting the presence of at least one sample in the sample set which is a duplicate sample of at least one other sample in the sample set, the detected presence of the at least one duplicate sample signifying an embedded data value, wherein the at least one duplicate sample and the at least one other sample form a duplicate set.

Moreover in accordance with an embodiment of the present invention the at least one other sample is adjacent to the at least one duplicate sample.

Further in accordance with an embodiment of the present invention said sampling the subject content at least twice is performed at a first predetermined interval.

Still further in accordance with an embodiment of the present invention said sampling the subject content at least twice is repeatedly performed at a second predetermined interval thus creating a plurality of sample sets.

Additionally in accordance with an embodiment of the present invention the second predetermined sampling interval varies.

Moreover in accordance with an embodiment of the present invention the second predetermined sampling interval is an integer multiple of one of 12, 15, and 25 times per second.

Further in accordance with an embodiment of the present invention said method further comprising: determining at least one interval between a later detected duplicate set and an earlier detected duplicate set; disregarding at least one of the earlier and later detected duplicate sets when the determined at least one interval is not equal to an expected interval.

Still further in accordance with an embodiment of the present invention the expected interval is predeterminedly variable.

Additionally in accordance with an embodiment of the present invention the expected interval is fixed.

Moreover in accordance with an embodiment of the present invention said subject content comprises video and audio content, and the at least one duplicate sample of at the least one other sample in the sample set comprises at least one of: duplicated video; duplicated audio; and duplicated audio and video.

Further in accordance with an embodiment of the present invention the at least one duplicate sample of at the least one other sample in the sample set comprising duplicated video signifies an embedded data value.

Still further in accordance with an embodiment of the present invention the at least one duplicate sample of at the least one other sample in the sample set comprising duplicated audio and video invalidates the embedded value.

There is also provided in accordance with still another embodiment of the present invention apparatus for embedding data in initial content, the initial content comprising synchronized video and audio, the apparatus comprising: an embedder operative to define at least one content segment in the initial content, and further operative to alter the video and audio synchronization in the at least one segment in accordance with the data to be embedded, thereby producing an altered content segment; wherein the altered content segment is viewable on a viewing device and the altered synchronization is imperceptible to a casual viewer.

Moreover in accordance with an embodiment of the present invention said altering comprises altering the video and audio synchronization by a predetermined amount of time.

Further in accordance with an embodiment of the present invention said defining comprises defining a plurality of content segments in the initial content and said embedder is further operative to repeat said altering for at least an additional one of the plurality of initial content segments.

Still further in accordance with an embodiment of the present invention the plurality of defined content segments are contiguous.

Moreover in accordance with an embodiment of the present invention the plurality of defined content segments are not contiguous.

Further in accordance with an embodiment of the present invention the not contiguous plurality of defined content segments are separated by predetermined intervals.

Still further in accordance with an embodiment of the present invention said altering comprises one of: altering the video and audio synchronization by a first predetermined amount to embed a first data value in one of the plurality of content segments; and altering the video and audio synchronization by a second predetermined amount to embed a second data value in one of the plurality of content segments.

Moreover in accordance with an embodiment of the present invention the first data value is a zero and the second data value is a one.

Further in accordance with an embodiment of the present invention one of the first and second predetermined amounts is zero.

Still further in accordance with an embodiment of the present invention the altered video and audio synchronization is reset in at least one predetermined location in the at least one altered content segment.

Still further in accordance with an embodiment of the present invention the at least one predetermined location comprises at least one of the beginning or the end of a group of pictures (GOP).

Further in accordance with an embodiment of the present invention the at least one predetermined location comprises at least one of the beginning or the end of the defined content segment.

Still further in accordance with an embodiment of the present invention said altering the video and audio synchronization comprises at least one of: advancing the audio relative to the video; advancing the video relative to the audio; delaying the audio relative to the video; and delaying the video relative to the audio.

Additionally in accordance with an embodiment of the present invention the initial content comprises video and audio time stamps, and altering the video and audio synchronization comprises at least one of: altering an audio time stamp; and altering a video time stamp.

Moreover in accordance with an embodiment of the present invention the initial content comprises audio frames and video frames, and said altering the video and audio synchronization comprises at least one of: dropping an audio frame; dropping a video frame; substituting an audio frame with an alternative audio frame; substituting a video frame with an alternative video frame; adding an audio frame; and adding a video frame.

Further in accordance with an embodiment of the present invention said adding an audio frame comprises adding an audio frame that is a duplicate of an adjacent audio frame, and said adding a video frame comprises adding a video frame that is a duplicate of an adjacent video frame.

Still further in accordance with an embodiment of the present invention, the alternative audio frame comprises a duplicate of an adjacent audio frame, and the alternative video frame comprises a duplicate of an adjacent video frame.

Additionally in accordance with an embodiment of the present invention, the alternative audio frame comprises a duplicate of an adjacent audio frame, and the alternative video frame comprises a duplicate of an adjacent video frame.

Moreover in accordance with an embodiment of the present invention the initial content comprises non-compressed content.

Further in accordance with an embodiment of the present invention, the initial content comprises compressed content.

Still further in accordance with an embodiment of the present invention, the compressed content comprises content encoded according to one of the following encoding standards: MPEG-1; MPEG-2; MPEG-4; VC-1; H.263; and H.264.

Additionally in accordance with an embodiment of the present invention, said apparatus is incorporated in a system comprising a renderer for rendering the altered content.

Moreover in accordance with an embodiment of the present invention, said apparatus is incorporated in a system comprising a transmitter for transmitting the altered content.

Further in accordance with an embodiment of the present invention, the transmitting comprises broadcasting the altered content to at least one consumer.

Still further in accordance with an embodiment of the present invention, the transmitting comprises broadcasting the altered content to at least one distributor.

Additionally in accordance with an embodiment of the present invention, said apparatus is incorporated in a system comprising a recording device for recording the altered content on a physical medium.

Moreover in accordance with an embodiment of the present invention, said apparatus is incorporated in at least one of: a set top box, a personal computer, a video projection system, a television, and a player of recorded media.

Further in accordance with an embodiment of the present invention the data comprises information relating to at least one of: a content producer, a content owner, a content distributor, geographic location, a date, a time, subscription related information, geographic targeting of the content, a Consumer Premises Equipment (CPE) serial number, a CPE user identification (ID), a smartcard serial number, a smartcard user ID, a subscriber ID, a customer ID, and subscriber information.

There is also provided in accordance with still another embodiment of the present invention, apparatus for retrieving data embedded in subject content, the subject content comprising Content Containing Embedded Data (CCED), the subject content further being identified as corresponding to initial content, the apparatus comprising: a sampler operative to sample at a known location in the subject content, thereby producing a subject content sample, the sampler further operative to sample at a location in the initial content corresponding to the known location in the subject content, thereby producing a corresponding initial content sample; a comparator operative to compare the subject content sample to the corresponding initial content sample; and a detector, operatively associated with said comparator, operative to detect audio and video synchronization changes in the subject content relative to the initial content, wherein said changes signify an embedded data value.

Additionally in accordance with an embodiment of the present invention, said sampler is operative to repeatedly sample at predetermined intervals.

Moreover in accordance with an embodiment of the present invention, said sampler is operative to repeatedly sample at predetermined variable intervals.

Further in accordance with an embodiment of the present invention the sampling interval is an integer multiple of one of 12, 15, and 25 times per second.

Still further in accordance with an embodiment of the present invention, said detector is further operative to determine at least one interval between a later detected change and an earlier detected change, and to disregard at least one of the earlier and the later detected changes when the determined at least one interval is not equal to an expected interval.

Moreover in accordance with an embodiment of the present invention, the expected interval is predeterminedly variable.

Further in accordance with an embodiment of the present invention, apparatus according to claim 80, wherein the expected interval is fixed.

There is also provided in accordance with still another embodiment of the present invention apparatus for retrieving data embedded in subject content, the subject content comprising Content Containing Embedded Data (CCED), the apparatus comprising: a sampler operative to sample the subject content at least twice, the at least two samples comprising a sample set; and a detector operative to detect the presence of at least one sample in the sample set which is a duplicate sample of at least one other sample in the sample set, the detected presence of the at least one duplicate sample signifying an embedded data value, wherein the at least one duplicate sample and the at least one other sample form a duplicate set.

Further in accordance with an embodiment of the present invention, the at least one other sample is adjacent to the at least one duplicate sample.

Still further in accordance with an embodiment of the present invention, said sampling the subject content at least twice is performed at a first predetermined interval.

Moreover in accordance with an embodiment of the present invention, said sampler is further operative to sample the subject content at least twice repeatedly at a second predetermined interval thus creating a plurality of sample sets.

Moreover in accordance with an embodiment of the present invention, the second predetermined sampling interval varies.

Further in accordance with an embodiment of the present invention, the second predetermined sampling interval is an integer multiple of one of 12, 15, and 25 times per second.

Still further in accordance with an embodiment of the present invention, said detector is further operative to determine at least one interval between a later detected duplicate set and an earlier detected duplicate set, and to disregard at least one of the earlier and later detected duplicate sets when the determined at least one interval is not equal to an expected interval.

Additionally in accordance with an embodiment of the present invention, the expected interval is variable.

Moreover in accordance with an embodiment of the present invention, the expected interval is fixed.

Further in accordance with an embodiment of the present invention, said subject content comprises video and audio content, and the at least one duplicate sample of at the least one other sample in the sample set comprises at least one of: duplicated video; duplicated audio; and duplicated audio and video.

Still further in accordance with an embodiment of the present invention, the at least one duplicate sample of at the least one other sample in the sample set comprising duplicated video signifies an embedded data value.

Additionally in accordance with an embodiment of the present invention, the at least one duplicate sample of at the least one other sample in the sample set comprising duplicated audio and video invalidates the embedded value.

There is also provided in accordance with still another embodiment of the present invention, apparatus for producing Content Comprising Embedded Data (CCED) comprising data embedded in initial content, the initial content comprising synchronized video and audio, the apparatus comprising: means for defining at least one content segment in the initial content; and means for altering the video and audio synchronization in the at least one segment in accordance with the data to be embedded in the initial content, thereby producing an altered content segment; wherein the altered content segment is viewable on a viewing device and the altered synchronization is imperceptible to a casual viewer.

There is also provided in accordance with still another embodiment of the present invention, apparatus for retrieving data embedded in subject content, the subject content comprising Content Containing Embedded Data (CCED), the subject content further being identified as corresponding to initial content, the apparatus comprising: means for sampling, operative to sample at a known location in the subject content, thereby producing a subject content sample, the sampling means further operative to sample at a location in the initial content corresponding to the known location in the subject content, thereby producing a corresponding initial content sample; means for comparing, operative to compare the subject content sample to the corresponding initial content sample; and means for detecting, operatively associated with said means for comparing, operative to detect audio and video synchronization changes in the subject content relative to the initial content, wherein said changes signify an embedded data value.

There is also provided in accordance with still another embodiment of the present invention, apparatus for retrieving data embedded in subject content, the subject content comprising Content Containing Embedded Data (CCED), the apparatus comprising: means for sampling, operative to sample the subject content at least twice, the at least two samples comprising a sample set; and means for detecting, operative to detect the presence of at least one sample in the sample set which is a duplicate sample of at least one other sample in the sample set, the detected presence of the at least one duplicate sample signifying an embedded data value.

There is also provided in accordance with still another embodiment of the present invention, physical media containing content, the content comprising synchronized video and audio, the content further comprising embedded data, the embedded data having been embedded according to the above methods.

BRIEF DESCRIPTION OF THE DRAWINGS

The present invention will be understood and appreciated more fully from the following detailed description, taken in conjunction with the drawings in which:

FIG. 2 is a simplified flowchart illustrating an example of operation of the embedder block 170, in accordance with an embodiment thereof;

FIG. 8a is a simplified timeline illustration of video and audio streams in a standard GOP, in a PAL TV system; and FIG. 8b is a simplified timeline illustration of video and audio streams in a standard GOP, in a PAL TV system, further demonstrating an embodiment of the invention.

DETAILED DESCRIPTION OF AN EMBODIMENT

Figure 1A:
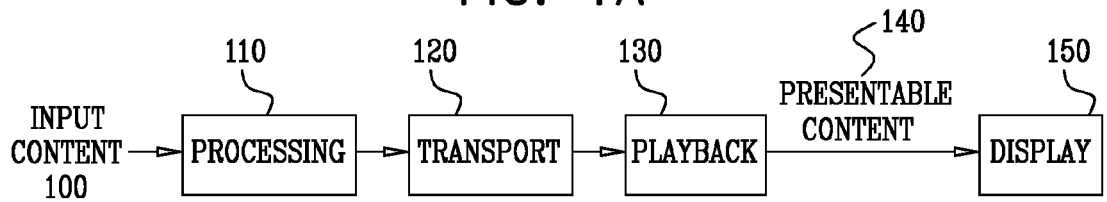
FIG. 1*a* is a highly simplified block diagram of a system for handling content, as is known in the art.

Reference is now made to FIG. 1A, which is a highly simplified block diagram of a system for handling content, as is known in the art. Input content 100 enters a processing block 110. The processed content is then relayed to a transport block 120, after which it enters a playback block 130. The playback block 130 has as its output presentable content 140 which is ready for viewing, utilizing the display block 150. The system of FIG. 1A will be described in more detail below.

Content, as used in claimed embodiments of the current invention, comprises video and audio information. The input content 100 entering the processing block 110 can, by way of non-limiting examples, be: in the form of analog or digital media; stored on physical media, such as film, DVD or other format of optical disk, static or dynamic memory, and video tape; or a received transmission, which is received via cable, satellite, DSL, optical fiber, or terrestrial broadcast. Prior to entering the processing block 110, the input content 100 may be used as provided or alternatively transcoded as necessary, such as, for example, by a telecine system for the conversion of film to a format suitable for broadcast. The content may be compressed or uncompressed and may have any appropriate frame rate, resolution, or bit rate. It should also be noted that the input content 100 entering processing block 110 can be in viewable form prior to any further processing as described herein.

The processing block 110 comprises any appropriate functions, and the apparatus necessary to implement them, for preparing the input content 100 for delivery to the transport block 120. These functions may include, by way of non-limiting examples: compressing, encoding, encrypting, meta-data generation, timecode generation, modulation, or recording the prepared content on physical media, such as utilizing optical disk production equipment. Compressing and encoding may be performed according to any known standard, including, by way of non-limiting examples: MPEG-1; MPEG-2; MPEG-4; VC-1; H.263; and H.264. The processing block 110 could comprise a head-end or other generic video distribution system. Further, the processing block could comprise functionality including video-on-demand (VOD), store-and-forward, push-video-on-demand (PVOD) or any other technique as known in the art for delivering content to a specific subscriber or customer, or a group of subscribers or customers. Customers may include distributors or resellers, who retransmit or otherwise further distribute content.

The transport block 120 comprises any appropriate functions, and the apparatus necessary to implement them, for transporting content to a recipient for playback or for further distribution or sale. These functions may include, by way of non-limiting examples: transmission, as well as reception, via terrestrial, cable, DSL, optical fiber, wireless or satellite; and physical media distribution such as mail, courier or retail outlet. Transmission further comprises functions such as multiplexing and modulation.

Content transported by the transport block 120 to a recipient for viewing is processed by the playback block 130. The playback block 130 comprises any appropriate functions, and the apparatus necessary to implement them, for processing the delivered content such that the output of the playback block 130 comprises presentable content 140 which is ready for viewing. These functions may include, by way of non-limiting examples: receiving, demodulating, descrambling, demultiplexing, decoding, and meta-data processing. The playback block 130 could comprise consumer premises equipment (CPE) such as, by way of non-limiting example, a set-top-box (STB), a television, a personal computer or a player of recorded media (e.g. a DVD player). The CPE could have a serial number, user number, or other identifying information associated with it. Further, the CPE could comprise a smart-card or other conditional access module (CAM), the smart-card having a serial number, user number, or other identifying information associated with it. Identifying information associated with the CPE or smart-card could be incorporated in hardware within each of them, or alternatively, stored in memory therein.

For implementations where the recipient receiving content delivered by the transport block 120 further distributes the delivered content, in whatever way is appropriate depending on the current form of the delivered content, as described previously, the playback block 130 is typically implemented at the final destination of the delivered content.

Presentable content 140 can be rendered for viewing by way of any appropriate displaying means as represented in FIG. 1A by display block 150. The display block 150 comprises any appropriate functions, and the apparatus necessary to implement them, for displaying the presentable content 140. These functions may include, by way of non-limiting examples: displaying on a television, computer display or video monitor; or projecting the content on any appropriate screening surface.

Figure 1B:
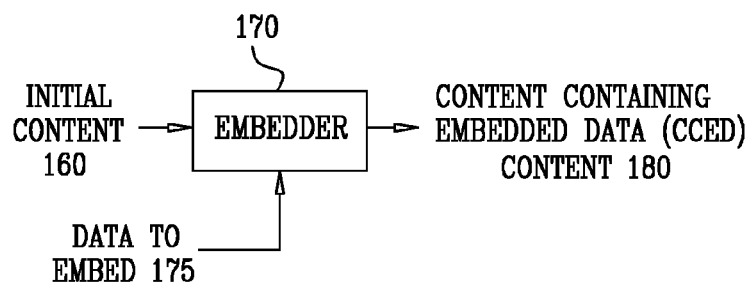
FIG. 1*b* is a depiction of the embedder block 170 as described in embodiments of the current invention.

Referring to FIG. 1B, the embedder block 170 comprises any appropriate functions, and the apparatus necessary to implement them, for embedding data in content through the desynchronization of the video and audio information in segments of the initial content 160, as described in embodiments of the current invention. As used herein, initial content 160 refers to content in which there has been no embedding of data according to any of the herein disclosed embodiments of the invention. Content Containing Embedded Data (CCED) 180 refers to content in which there has been embedding of data according to any of the herein disclosed embodiments of the invention. Data to embed 175 is provided to the embedder 170 for embedding in the initial content 160.

Embedding data, particularly data related to watermarking, in content comprising video and audio information, utilizing changes in synchronization of the video and audio information in accordance with the data to be embedded and as described in embodiments of the current invention, can be performed at various stages in the system for handling content depicted in FIG. 1A, and will be described subsequently. The current invention relates to embedding data in content wherein the content comprising the embedded data is viewable on a viewing device and changes to the content caused by the embedding are imperceptible to a casual viewer. A casual viewer is, for example, an average person sitting down to watch television, or see a movie. It is known in the art that synchronization errors in video content should preferably be kept to less than 100 ms, with less than 60 ms being desirable, to remain imperceptible to a casual viewer. Synchronization changes as introduced by embodiments of the current invention will typically be responded to by casual viewers in the same way that synchronization errors are.

Data 175 embedded by various embodiments of the current invention may include unique, identifying, details as appropriate according to the embodiment. The data to embed 175 can comprise data representing information not related exclusively to a specific consumer of the CCED 180, such as, by way of non-limiting examples: information relating to the content producer, content owner, or content distributor; geographic information; date information; time information; subscription related information; etc. Subscription related information may comprise information relating to which subscription tiers the content is intended, geographic targeting of the content, such as black-out information, or any other appropriate information known in the art. In other embodiments the embedded data can represent information related to the specific consumer of the content, such as, by way of non-limiting examples: CPE serial number, CPE user ID, smartcard serial number, smartcard user ID, subscriber ID, customer ID, subscriber information etc.

Figure 1C:
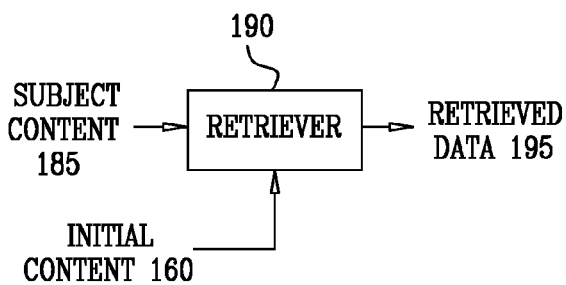
FIG. 1*c* is a depiction of the retriever block 190 as described in embodiments of the current invention.

Additionally, referring now to FIG. 1C, retriever block 190 is shown. The retriever block 190 comprises any appropriate functions, and the apparatus necessary to implement them, for retrieving data 195 from subject content 185, as described in embodiments of the current invention. Subject content 185, as used herein, refers to any content on which retrieval of embedded data 175 can be attempted by the retriever 190 according to any of the herein disclosed embodiments of the invention, wherein the existence of the data 175, embedded according to embodiments of the invention, is unknown. The subject content 185 may be in any appropriate form, and stored on any appropriate media as discussed herein.

There are various methods for detecting and/or extracting embedded data 175 from CCED 180 as contemplated by the claimed embodiments of the current invention. The methods can generally be divided into two categories: source needed and source not needed.

In methods in which the source is needed, initial content 160 is needed in order to retrieve data 195 from subject content 185. The initial content 160 is generally needed in order facilitate comparison of the subject content 185 to the initial content 160. The need for initial content 160 does not demand that the specific copy of the initial content 160, in which data 175 was embedded by the embedder 170, be used. Any copy of appropriate quality, which does not have data embedded in it utilizing embodiments of the current invention, may be used. In cases where the subject content 185 has a low frame rate, the retriever 190 may resample the initial content 160 at the same frame rate of the subject content 185 to facilitate retrieval.

Retrieved data 195 comprises the data to embed 175 as well as any additional data as embedded by the embedder 170. The additional data can, for example, comprise data relating to the embedder 170 itself, such as version number.

In methods in which the source is not needed, initial content 160 is not needed in order to retrieve data 195 from subject content 185. The retrieved data 195 is retrieved on the basis of the subject content 185 alone or in combination with other data, such as, for example, a database.

Techniques for retrieval of data from subject data performed via detection of duplicate images in the content or via comparison of the subject content with associated initial content, is known in the art. See, for example, "CANDID: Comparison Algorithm for navigating digital image databases", Kelly, P. M. Cannon, T. M., Proceedings of the Seventh International Working Conference on Scientific and Statistical Database Management, 1994, pages 252-258.

Embodiments of the invention include embedding data prior to transport and, alternatively, post transport. Embedding data prior to transport can be performed: directly on the initial content 100; as a part of the processing of content performed in the processing block 110; or post the processing of content performed in the processing block 110.

Embedding data post transport can be performed: prior to processing of content performed in the playback block 130; as a part of the processing of content performed in the playback block 130; or post the processing of the content performed in the playback block 130. The processing 110, transport 120, playback 130, and display 150 blocks are shown as individual blocks for the sake of simplicity. Blocks can be combined for the sake of design or manufacturing without significant impact on the implementation of the embodiments as described herein. By way of non-limiting example, playback block 130 could be incorporated in display block 150.

In content streams encoded according to the MPEG standard format, or any other appropriate similar format, the audio and video streams therein generally contain a presentation time stamp (PTS) and a decoding time stamp (DTS). See, for example, the MPEG standard document "BS EN ISO/IEC 13818-1: 1997 Information technology—Generic coding of moving pictures and associated audio information, Part-1—Systems". The PTS and DTS may have different names in different standards, although their functions are generally similar. For systems operating in Synchronous Mode, PTS and DTS are used during playback to synchronize the audio and the video contained in the MPEG stream. The PTS and DTS need not be included in every frame; they could, for example, be included in the packet header of a packet containing a plurality of frames. In some implementations, frames may include a value which represents an offset from the last PTS or DTS sent or, alternatively, an offset from the frame immediately preceding the frame in question. As used herein, reference to PTS and DTS are intended to include equivalent information, including, as discussed above, offset values and the like, which convey similar information. In Asynchronous Mode, playback generally does not synchronize the audio and the video using time stamps but, rather, plays them as they are received.

Three alternatives for embedding data prior (PR) to transport, as well as possible detection methodologies associated with each alternative, are now briefly described, they will be referenced as PR1, PR2 and PR3.

PR1. Synchronization of initial content audio and video is modified via shifting. A shift detected between the audio and the video in subject video is compared to the initial content to facilitate detecting and decoding embedded data.

PR2. Synchronization of initial content audio and video is modified via duplication and/or removal of frames (generally one frame at a time). Detection and decoding of embedded data are facilitated by identifying duplicated and/or removed frames in subject content.

PR3. In MPEG-2, or other coded formats such as: MPEG-1; MPEG-4; VC-1; H.263; and H.264, synchronization of initial content audio and video is modified via real-time or off-line modification of content video and audio presentation time information. Detection and decoding of embedded data are facilitated by identifying any of the following in subject content: a synchronization shift between the subject content audio and video; a duplication of images in the subject content; and missing images in the subject content.

Two alternatives for embedding data post (PO) transport, as well as possible detection methodologies associated with each alternative, are now briefly described, they will be referenced as PO1 and PO2.

PO1. Video frames are duplicated and/or removed in real-time or off-line. This type of video frame manipulation could, for example, be performed by a module in a STB, television, or in a projection system. Off-line manipulation could, for example, be performed where the content is stored on a hard-drive in a STB, personal computer, television, or projection system. Detection and decoding of embedded data are facilitated by identifying duplicated and/or removed frames in subject content.

PO2. In MPEG, or other coded formats as previously disclosed, the playback device modifies, in real time, the content video and audio presentation time information. Detection and decoding of embedded data are facilitated by identifying any of the following in subject content: a synchronization shift between the subject content audio and video; a duplication of images in the subject content; and missing images in the subject content.

Non-limiting examples of methods for embedding data prior to transport, according to the three alternatives discussed previously, PR1, PR2 and PR3, will now be presented.

Reference is now made to FIG. 2, which is a simplified flowchart illustrating an example of the embedder 170 (FIG. 1B), in accordance with an embodiment thereof. In this first example, according to PR1, data is embedded in a content stream which is to be broadcast by a head-end. Prior to encoding of a content stream in the head-end, desired data, generated by the data bit stream generator 205, is embedded into the stream. The video and audio content are shifted by a predetermined amount, advancing or delaying relative to each other, thereby causing the audio and video to be out of sync in comparison to the initial content 160 (FIG. 1B).

In this example t is the predetermined length of time of desynchronization intended to signify a bit of the data bit stream. Desynchronization can be predefined as signifying a "1" or "0" as desired. While the value of insert a data bit block 210 is yes, the decoding speed, as set in block 215, is increased by a percentage p, such that x, in decode block 230, is set to 1+p for t/2 milliseconds (ms). The decoding speed, as set in block 215, is then decreased by a percentage p, such that x, in decode block 230, is set to 1−p for t/2 ms, thus resynchronizing the audio and video streams. The value of t could, by way of non-limiting example, be the time equivalent of between 24 and 30 frames. At the end of t, x is reset to 1.

While the value of insert a data bit 210 is no, stream synchronization is maintained and x, in decode block 230, is left at 1. The decoding of decode blocks 230 and 245 can be performed in the digital or analog domains. In this example, the variables t, x, and p are used to define the content segments in which the synchronization alterations are to be performed. In this example, if it has been predefined that appropriate desynchronization of the audio and video streams signifies a "1" then, if the next bit in the data bit stream as generated by the data bit stream generator 205 is a "1", the value of insert a data bit block 210 is set to "yes" appropriately. If the next bit in the generated data bit stream is "0", the value of insert a data bit block 210 is set to "no" appropriately. Throughout this description, the term resynchronize is used to mean that the synchronization is reset.

At the time of encoding, shifts performed in this example can be logged in a database of time codes, which may be used for improved data retrieval efficiency. While FIG. 2 shows the decoding speed being adjusted relative to the audio stream 220, it can be implement relative to the video stream 235 as well, with care paid to the issue of the flicker rate of the video which would need to be adjusted appropriately as is known in the art. The remainder of FIG. 2 is believed to be self explanatory with reference to the above discussion.

In order to retrieve data 195 (FIG. 1C) embedded according to this example, scan the subject content 185 (FIG. 1C) looking for audio/video shifts in comparison to the initial content 160 (FIG. 1C) as, for example, shown in FIG. 7, described below. Capturing and scanning the subject content can be performed with any appropriate system as known in the art, for example, a PC with a video capture card which can be used to acquire the presentable content 140 (FIG. 1A). The shift database, if available, can be used to make data retrieval more efficient.

Figure 7:
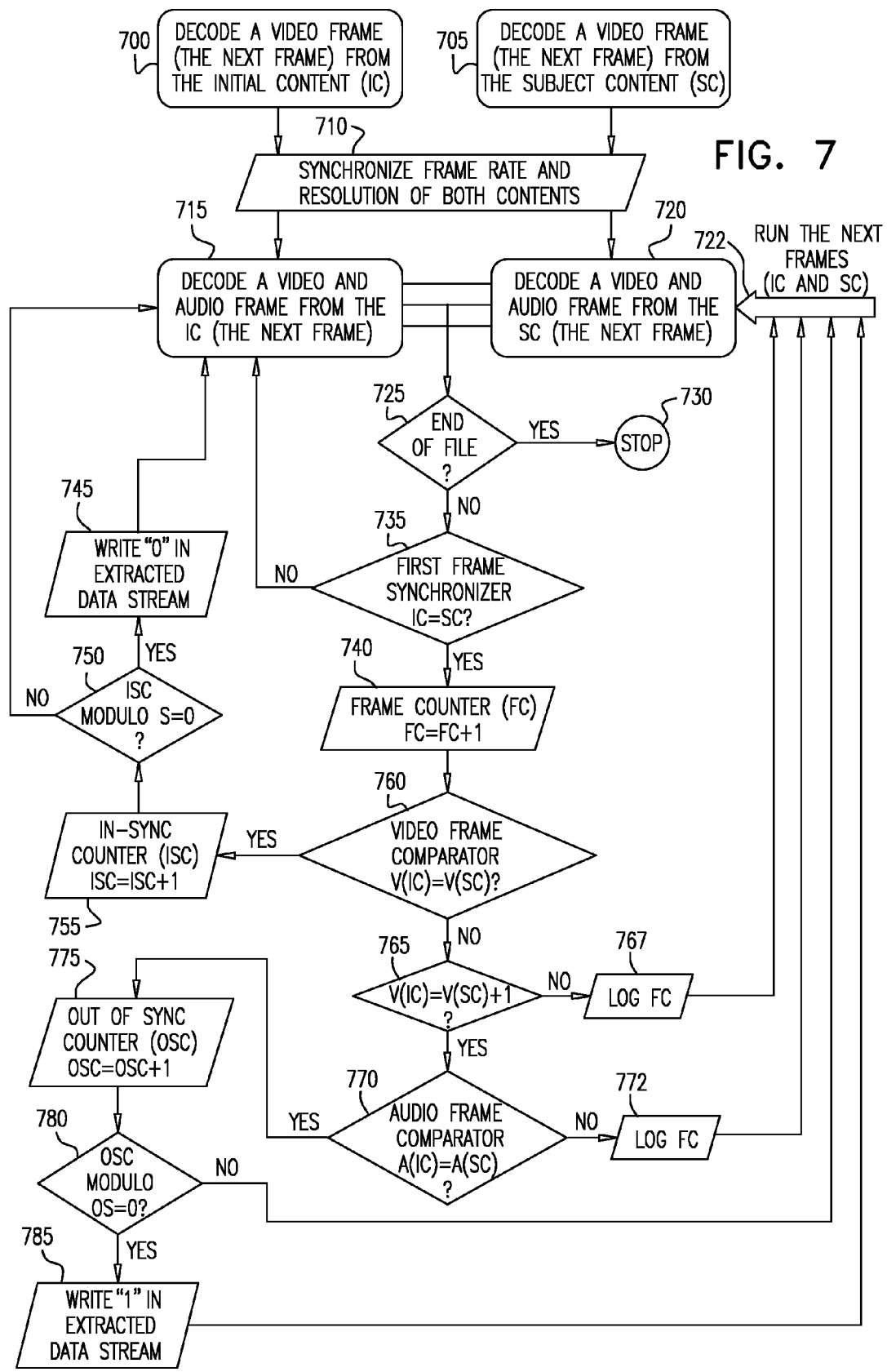
FIG. 7 is a simplified flowchart illustrating an example of operation of the retriever block 190, in accordance with an embodiment thereof.

Reference is now made to FIG. 7, which is a simplified flowchart illustrating an example of the retriever 190 (FIG. 1C), in accordance with an embodiment thereof. In this example the subject content 185 (FIG. 1C) comprises CCED in which appropriate desynchronization of the audio and video streams signifies a "1". The first frame synchronizer test block 735 operates only at the beginning of the data retrieval process. Upon the first "yes", this block is bypassed, with the process continuing to the FC block 740. If the value of the first frame synchronizer test block 735 is no, it causes the IC to move to the next frame. Alternatively, block 735 can be implemented such that upon the first "yes," in order to check if the subject content 185 (FIG. 1C) is CCED 180 (FIG. 1B), both IC and SC are advanced frame by frame until x dropped frames are found, prior to proceeding with the retrieval process.

The video frame comparator 760 checks if the IC and SC frames are substantially the same. In the ISC Modulo S=0 block 750, S is a predetermined parameter that represents the expected frame duration of the stream remaining in a synchronized state, in this example representing a "0". Block 765 checks if a single frame has been dropped in the subject content.

The log FC blocks 767 and 772 are used to indicate that the content might have been manipulated in a non-authorized fashion since the "no" values of blocks 765 and 770 are not expected in the event of non-manipulated content. Such indicated manipulation may be used to invalidate the data, preventing writing of an extracted bit in block 785. In other embodiments, the writing in block 785 could proceed in any event, with the suspected manipulation merely noted in blocks 767 and 772.

Test block 780 uses a predetermined parameter OS, which represents the frame duration that a shift is maintained, (i.e. the number of unsynchronized frames), in this example representing a "1". The retrieved data 195 is comprised of the extracted data stream produced by blocks 745 and 785. The remainder of FIG. 7 is believed to be self explanatory with reference to the above discussion.

Figure 3:
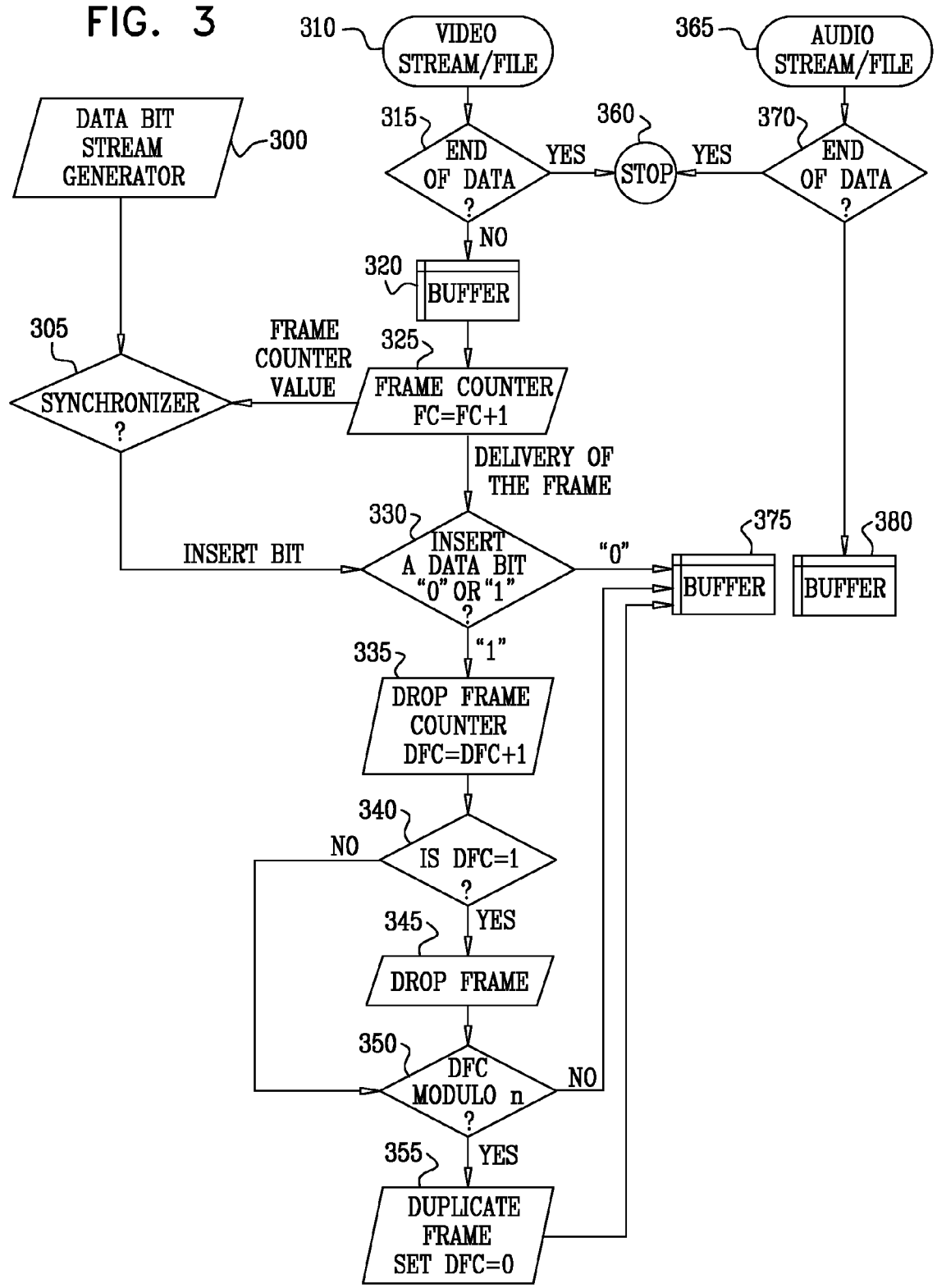
FIG. 3 is a simplified flowchart illustrating an example of operation of the embedder block 170, in accordance with an embodiment thereof.

Reference is now made to FIG. 3, which is a simplified flowchart illustrating an example of the embedder 170 (FIG. 1B), in accordance with an embodiment thereof. In this example, according to PR2, data is embedded in a content stream which is to be broadcast by a head-end. While working with uncompressed video and audio data at the time of encoding, in the processing block 110 (FIG. 1A), a shift function is used to drop and add video or audio frames in the stream, thereby causing desynchronization. The adding of frames is followed by a dropping of frames, and vice versa, to resynchronize the stream.

The actual position in the content stream of the dropped frame is synchronized by the synchronizer 305. A predefined parameter n represents the embedding duration, the time the content is kept out of sync prior to being resynchronized by block 355. For example, n=10 means that the shift duration is a period of time equivalent to 11 frames (the frame desynchronized plus 10 more) for each bit of embedded data. A predefined parameter m represents the embedding interval, the time period between bits. For example, m=30 means a bit is embedded every period of time equivalent to 30 frames. The values for m and n can be changed independently and dynamically, as long as the changes are predetermined, and in this example, are used to define the content segments in which the synchronization alterations are to be performed.

The output of the synchronizer 305 is a flag, which is held high when a bit requiring desynchronization is to be inserted, for the duration of n. The format of the embedded data can be defined such that the desynchronization is performed for a data bit of one or zero as predefined. Activation of the synchronizer 305 is based on the predetermined time intervals m and n, which are triggered by the frame counter 325. The signals output by the synchronizer are time-based and not frame-based in order to make the system more robust relative to variances in the frame rate of playback.

The drop frame block 345 drops a frame of the stream in order to initiate a shift. Block 350 counts the number of frames that are desynchronized. The remainder of FIG. 3 is believed to be self explanatory with reference to the above discussion.

Figure 6:
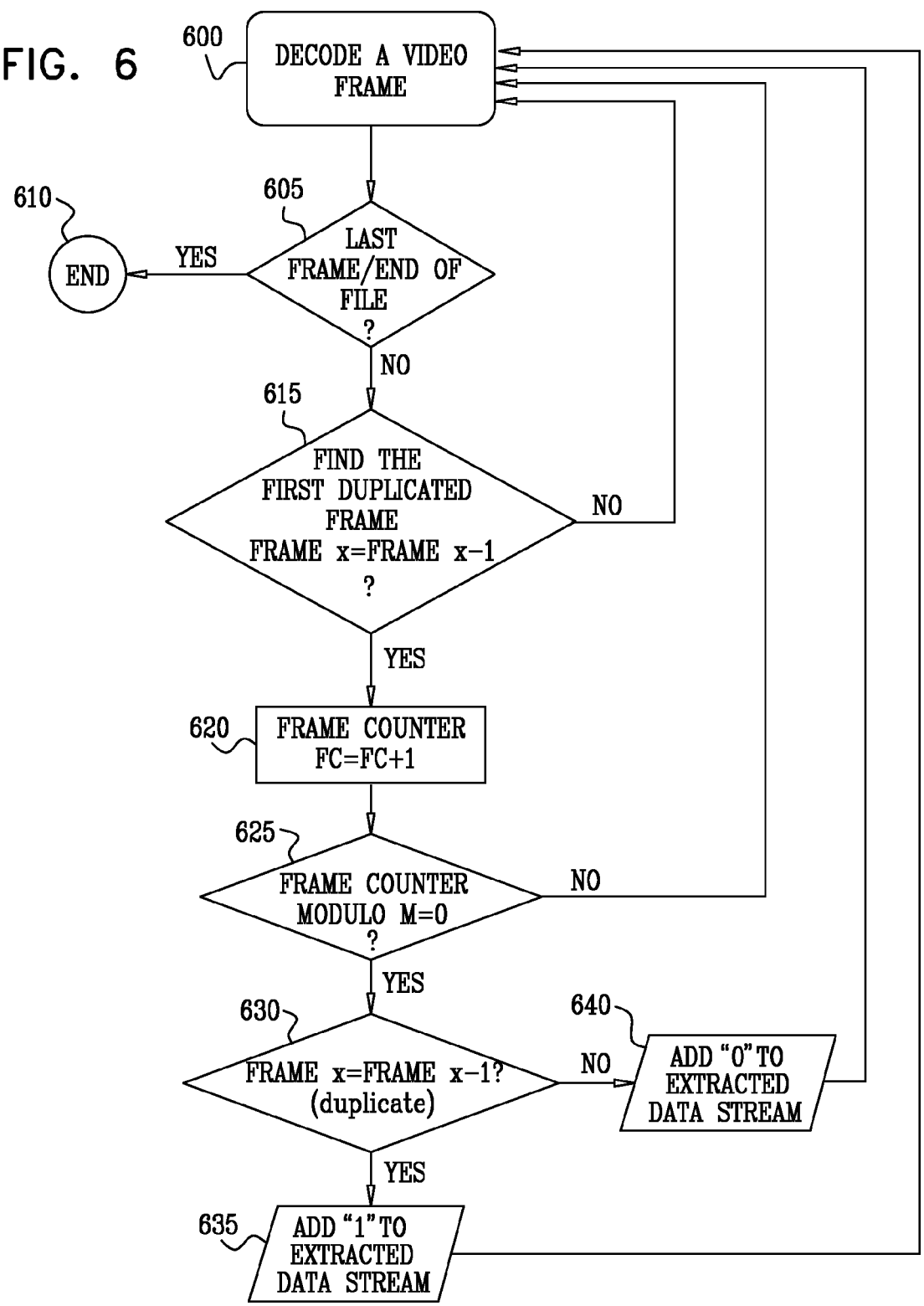
FIG. 6 is a simplified flowchart illustrating an example of operation of the retriever block 190, in accordance with an embodiment thereof.

Reference is now made to FIG. 6, which is a simplified flowchart illustrating an example of the retriever 190 (FIG. 1C), in accordance with an embodiment thereof. In order to retrieve data 175 (FIG. 1B) embedded according to PR2, the subject content 185 (FIG. 1C) is captured and then scanned in retriever 190 (FIG. 1C) in order to find duplicated frames. If there is a detected duplication during a time interval corresponding to the embedding interval, which can be stored in the head-end, the detected duplication is considered an embedded bit and output as retrieved data 195 (FIG. 1C). If there isn't a duplication during the time interval, a bit with the opposite value is considered detected.

In block 615, the first duplicated frame of the recorded subject content 185 (FIG. 1C) is found. Upon finding the first duplicate frame, this block 615 is bypassed (i.e. the output is always yes). Alternatively, in order to check if the subject content 185 (FIG. 1C) is CCED 180 (FIG. 1B), block 615 can be implemented so as to find x dropped frames prior to proceeding with the retrieval process. Block 625 ensures that one data bit is extracted every m frames, where m is a predetermined parameter. In block 630 frame x is compared to frame x−1. In some embodiments comparing more than two frames is performed. The frames compared make up the sample set. Frame duplicates within the sample set make up the duplicate set. The retrieved data 195 (FIG. 1C) is comprised of the extracted data stream produced by blocks 635 and 640. The remainder of FIG. 6 is believed to be self explanatory with reference to the above discussion.

In an alternative embodiment, the data retrieval method of PR1 as described relative to FIG. 7, can be used to detect data 175 (FIG. 1B) embedded using the embedding method of PR2 as described relative to FIG. 3. In such an embodiment, as noted in PR1, the initial content 160 (FIG. 1B) would be needed. If the retrieval method of PR1 is used then, in addition to frame duplications, synchronization changes due to frame dropping can be detected as well. The data retrieval method of PR1 can also be used to verify embedded data 175 (FIG. 1B) detected using the data retrieval method of PR2, or to detect if the data stream has been tampered with, by contrasting the detected embedding intervals and durations with those expected.

In the above embodiment, either the detection of dropped frames or duplicated frames can be used to signify a bit of embedded data, however, the two methods should preferably not be used simultaneously, since each dropped frame must have a corresponding added frame to retain gross synchronization, and vice versa as previously described.

Figure 4:
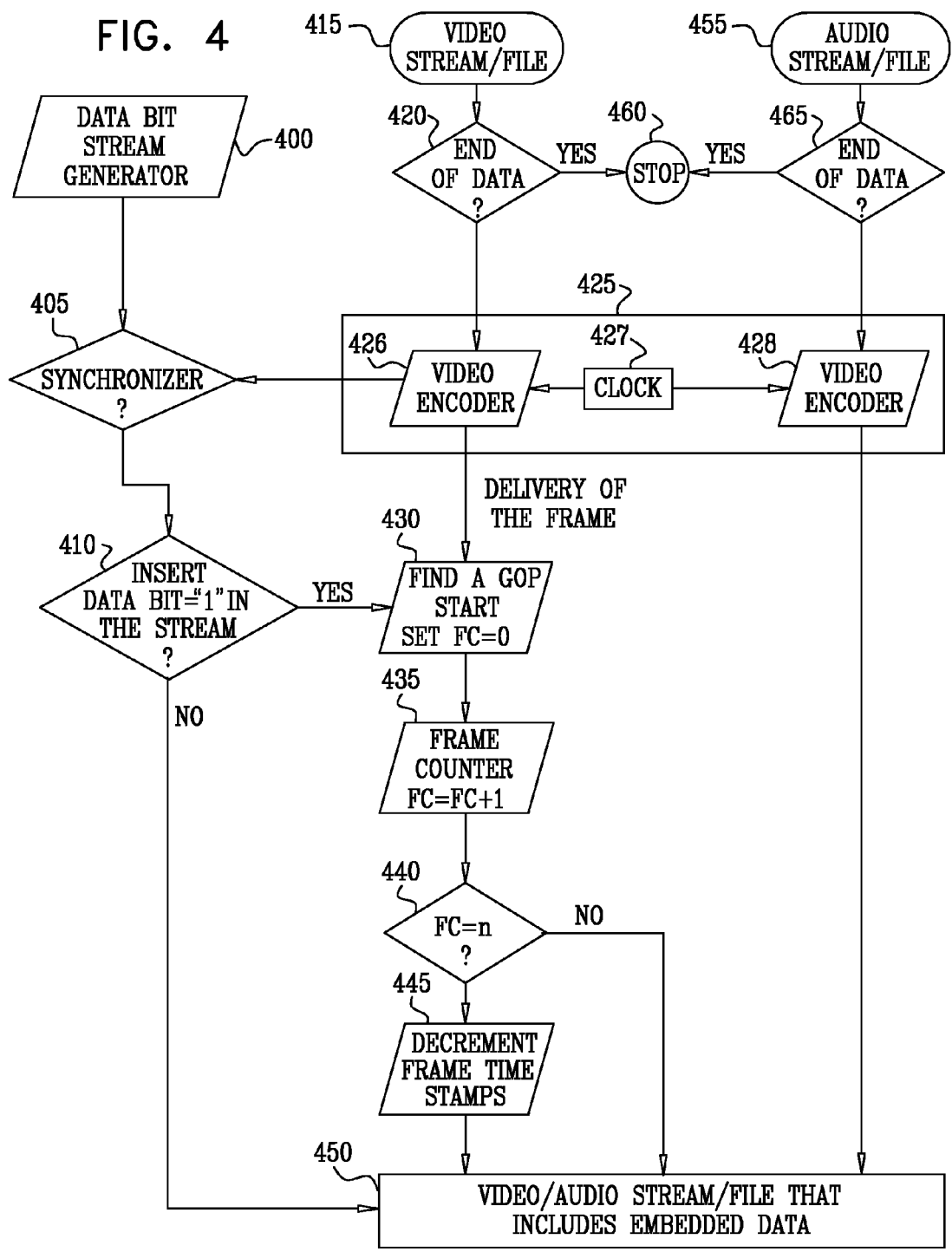
FIG. 4 is a simplified flowchart illustrating an example of operation of the embedder block 170, in accordance with an embodiment thereof.

Reference is now made to FIG. 4, which is a simplified flowchart illustrating an example of the embedder 170 (FIG. 1B), in accordance with an embodiment thereof. In an example, according to PR3, data is embedded in an encoded MPEG-2 content stream, which is to be broadcast by a head-end. The embedder 170 (FIG. 1B) of this example comprises a PTS/DTS modification function in the processing block 110 (FIG. 1A) comprising the head-end. The function selectively alters the PTS or both the PTS and DTS. Playback block 130 (FIG. 1A), when used to process MPEG content, generally comprises a standard video decoder as is known in the art. Alterations of the PTS/DTS cause shifting of the video from the audio in the stream during playback, which in turn causes the standard video decoder in the playback block 130 (FIG. 1A), operating in synchronized mode, to remove a frame or duplicate a frame (frame freeze) appropriately, as is known in the art.

The output of block 425 can be a PES (packetized elementary stream) that includes time stamps, or it could be a single multiplexed stream. Using m, a predetermined embedding interval, the synchronizer 405 synchronizes the data bit stream of block 400 with the encoded video from block 426. The value of m can be expressed as a period of time, as a number of GOPs, or as any other appropriate measure for which the period of time it represents is known. It is known in the art that a GOP is a group of successive pictures within a MPEG-coded video stream. MPEG-coded video streams typically consists of successive GOPs. If m is expressed as a number of GOPs, the equivalent amount of time is used. For example, if m=(3 GOPs) and a GOP has a duration of 500 ms, then m=1.5 seconds. In this example, in block 410, the data value "1" is the trigger for a frame drop, however, the data value "0" could be used as the trigger instead. An output of yes from block 410 corresponds to "drop a frame", an output of no corresponds to "don't drop a frame", i.e. let the video flow as-is. In block 440, the parameter n corresponds to the number of frame in the current GOP in which the PTS is to be altered. In this example, the variables m and n are used to define the content segments in which the synchronization alterations are to be performed.

In the present example, the CCED 180 comprises the audio and video streams that include embedded data, as output by block 450. The CCED 180 is, in this example, resynchronized at the end of the current GOP. The resynchronization is performed by the standard video decoder, which in this example, is present in the playback block 130 (FIG. 1A).

In order to retrieve data embedded according to the PR3 example, duplication and dropping analysis is performed as described above relative to FIG. 7, in the PR2 example.

Non-limiting examples of methods for embedding data post transport, according to the two alternatives discussed previously, PO1 and PO2, will now be presented.

Figure 5:
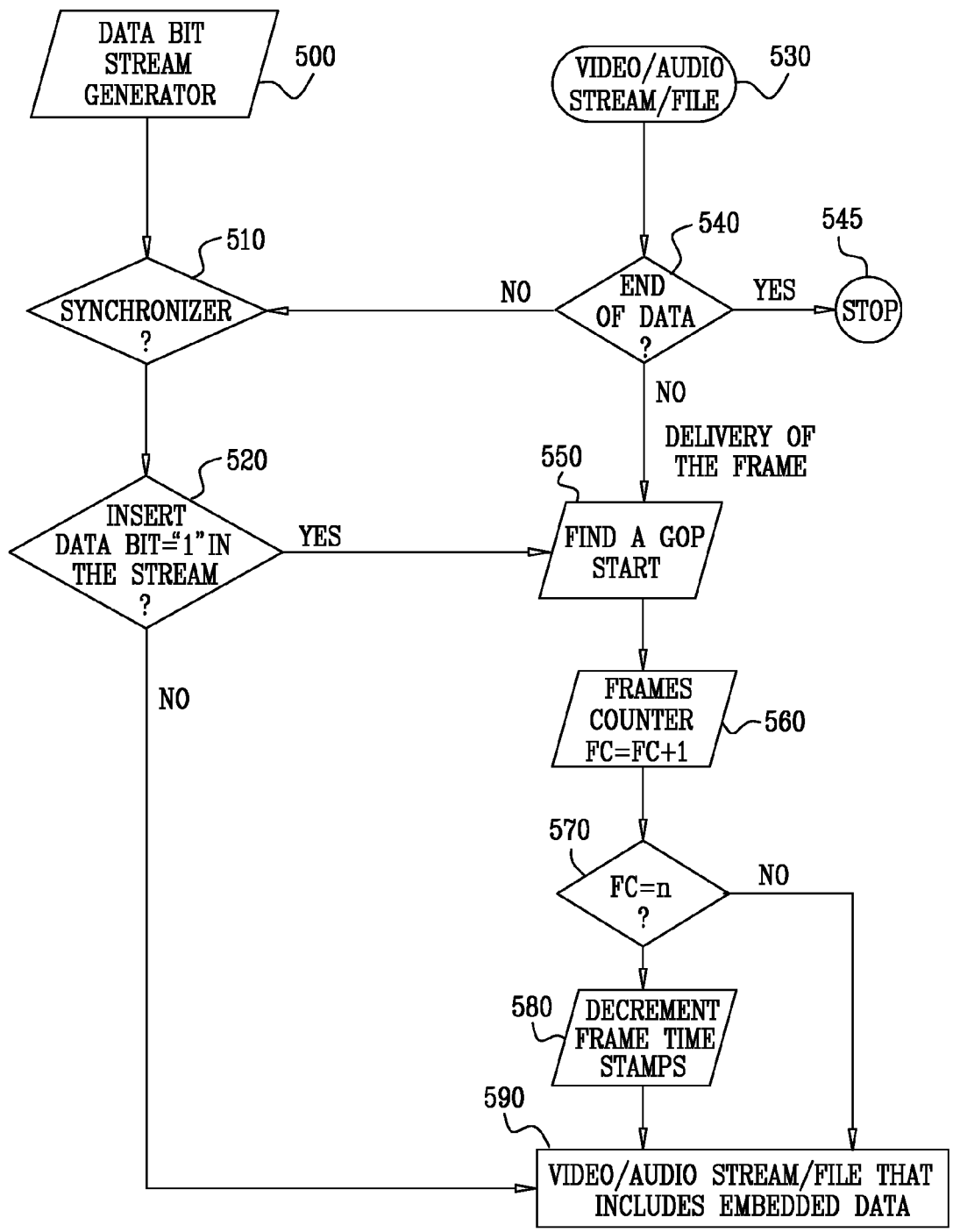
FIG. 5 is a simplified flowchart illustrating an example of operation of the embedder block 170, in accordance with an embodiment thereof.

Reference is now made to FIG. 5, which is a simplified flowchart illustrating an online PTS/DTS modification function comprised in embedder 170 (FIG. 1B), in accordance with an embodiment example thereof. In this example, in accordance with PO1, the embedder 170 (FIG. 1B) is comprised in the playback block 130 (FIG. 1A) which comprises a standard video decoder. In a content stream 530 encoded according to the MPEG standard, or any other appropriate similar format, a shift of the video relative to the audio during playback is caused. PTS/DTS modifications are used to cause the video decoder in the playback block 130 (FIG. 1A) to remove a frame or duplicate a frame (frame freeze) appropriately. Alternatively, the playback block 130 (FIG. 1A) can be so constructed as to skip frames directly, without need to alter the PTS and DTS.

The data may be embedded under local control of the playback block 130 (FIG. 1A) or, alternatively, performed under remote instruction, for example by a head-end as comprised in the processing block 110 (FIG. 1A), for implementations where the content is transmitted to the user. The remote instruction can be via data included in a header in the MPEG stream or via any other appropriate data transfer method. The local control can, for example, be via a preprogrammed CPE comprising the playback block 130 (FIG. 1A), which could, for example, comprise a set top box for implementations where the content is transmitted to the user, or a media player, such as a DVD player, where the content is prerecorded.

In this example, the local controls and/or remote instructions instruct the data bit stream generator 500 to include data relating to the consumer as well as the provider of the initial content in the data bit stream. The synchronizer 510 receives the encoded video. It then synchronizes the data bit stream insertion based on m, the predetermined embedding interval. The interval could be, for example: every GOP; every other GOP; every two GOPs followed by every three GOPs; every 12 frames; every 24 frames etc. The value of m can also be expressed as a period of time. If m is expressed as a number of GOPs or frames, the equivalent amount of time is used by the synchronizer 510. For example, if m=(3 GOPs) and a GOP has a duration of 480 ms, then m=1.44 seconds. As another example, if m=(36 frames) and the system is MPEG-2 PAL encoded, then the 36 frames are equivalent to (36*0.48 sec)/12=1.44 seconds According to this example, in block 520, the data value "1" is the trigger for a frame drop, however, the data value "0" could be used as the trigger instead. An output of yes from block 520 corresponds to "drop a frame", an output of no corresponds to "don't drop a frame", i.e. let the video flow as-is. In block 570, the parameter n corresponds to the number of frame in the current GOP in which the PTS is to be altered. The variables m and n are used to define the content segments in which the synchronization alterations are to be performed.

The CCED 180 (FIG. 1B) comprises the audio and video streams that include embedded data, as output by block 590. The CCED 180 (FIG. 1B) is generally resynchronized at the end of the current GOP. The resynchronization is performed by a standard MPEG decoder, operating in synchronized mode, which would, in this embodiment example, be present in the playback block 130 (FIG. 1A). The remainder of FIG. 5 is believed to be self explanatory with reference to the above discussion.

In order to retrieve data embedded according to the PO1 example just presented, duplication and dropping analysis can be performed using the same method described above in the PR2 example relative to FIG. 6. While using this method the decoder must be in synchronized mode.

In another example, in accordance with PO2, data is embedded by an operator in a content stream which is to be point-to-point broadcast by a head-end to a specific customer. The content could be downloaded from a server by a specific customer, in which case data is embedded by a content distributor. This example is implemented as in the PR3 example and FIG. 4, presented previously. A difference in the present example is that data related to a specific customer can be embedded in the stream since the broadcast or download is for a specific customer. By performing the embedding on the server side, a verifier (a module typically present in CPE to perform conditional access (CA) verification functions) is not needed in the customer's CPE. In other words, this embodiment could be used where playback decoding is performed on any appropriate commercial and free to air STB.

In this example, data related to a specific customer, and which is known to the operator or distributor, can be embedded. Such data could include a client identifier (such as, for example, an IP address, a credit card number or a client number). Other data not related to the specific customer could also be embedded, such as content or source related data. This embodiment creates a double check method, since the identity of the specific customer and his/her related data are known in advance.

A potential use case for this embodiment includes where the playback block 130 (FIG. 1A) is comprised in a non CA STB or a PC, and the customer purchases content from a TV portal. Using this method, the broadcaster/portal can pair the customer with the purchased content.

In this example, the decoder preferably is in synchronized mode. Retrieval according to this example is via duplication and dropping analysis, which can be performed using the same method described above in the PR2 example relative to FIG. 6.

Referring now to FIG. 8, simplified timeline illustrations of video and audio streams are presented. In FIG. 8A, the illustration represents a standard GOP, consisting of 12 frames, in a PAL TV system. The first GOP starting PTS is 800, the second GOP starting PTS is 900.

In FIG. 8B, the illustration demonstrates an embodiment of the invention, wherein a video frame is dropped to cause desynchronization, followed by a video frame duplication to resynchronize the audio and video frames. In the first GOP 800, the first frame PTS (which is 800) is modified to a lower number (in this example, 799, labeled "missed frame") thereby causing the second frame PTS to become 800. This will cause the playback block 130 (FIG. 1A) to skip the first frame (i.e., it doesn't present this frame) and the sync is shifted by one frame.

At the end of the first GOP 800, because the audio frame number 812 does not have a matching video frame, the playback block 130 (FIG. 1A) will freeze its video presentation on video frame 811 while playing audio frame 812. The second GOP 900 (frame 900) contains new sync PTS data that will resynchronize the stream ("PTS reset").

In some implementations, while encoding the content, processing block 110 (FIG. 1A) does not place a PTS on each frame, time offset parameters are used instead, to the same effect. Likewise, while decoding, the playback block 130 (FIG. 1A) does not depend on a PTS in each frame to maintain the synchronization while playing, but rather uses internal audio/video clocks and offset parameters. The PTSs are reference points that are used to "reset" these clocks. In MPEG-1 and MPEG-2, for example, the maximum time between PTSs is 700 mS, however, it is usually at the beginning of each GOP (approximately every 500 ms). This embodiment of the invention requires the playback block 130 (FIG. 1A) decoder to be operating in synchronized mode.

A non-limiting example of the implementation and operation of an embodiment of the invention will now be presented: Insertion: (Based on Data Embedding Method PO1 and FIG. 5)

1. A broadcaster broadcasts a PAL MPEG-2 video and, in addition, sends an instruction signal to each of a plurality of STBs, over a secure channel, to activate the embedder 170 (FIG. 1B) in each STB. The signal includes some of the data to embed 175, including the broadcaster ID, and parameters that are related to the method of operation of the embedder 170 (FIG. 1B), such as m, the embedding interval, and n, the embedding duration. In this example, the value of m is 480 milliseconds and the value of n is eleven frames, and corresponds to the example presented in FIG. 8.

2. The data bit stream generator 500, a secured software module in the embedder 170 (FIG. 1B), extracts a smart card ID or any other unique identifier available, and adds to it the date and time. For example: for ID 12345 on Jan. 1, 2008 at 12 PM the string can look like: 123450101081200. The data to embed 175 comprises all of the gathered or otherwise acquired data. A header containing the broadcaster ID as well as a checksum are added to the data bit stream by module 500. The header can contain other appropriate data as well.

3. The synchronizer module 510 gets the broadcasted video frames, in this example an MPEG stream. According to m and n (see above) the synchronizer 510 generates a signal to the insert data bit module 520. In this example, to embed a value of "1" in the content, a desynchronization will be introduced, in this case a decrementing of the time stamp on a frame. To embed a value of "0" in the content no desynchronization will be introduced.

4. The insert data bit module 520 acts according to the synchronizer module 510. Upon a signal from the synchronizer 510, if a value of "1" is to be embedded, module 520 will signal module 550 to find a GOP start, alternatively, if no embedding is to take place, or if a value of "0" is to be embedded, module 520 signals module 590 to deliver the content as is, thereby bypassing modules 550-580.

5. Upon module 550 being signaled to find a GOP start, Find GOP start module 550 extracts the content header time stamps (such as PTS and DTS).

6. Frame counter 560 counts the number of frames from the beginning of the GOP.

7. Upon getting to the $n^{th}$ frame as detected by module 570. Decrement module 580 manipulates the time stamps of the stream, causing the frame to be skipped when decoded in the playback module 130 (FIG. 1A). The stream is then forwarded to module 590.

8. The module "video/audio stream/file that includes embedded data" 590 gets the appropriate stream, as discussed in step 4 and step 7, and outputs it as CCED 180 (FIG. 1B).

9. This CCED 180 (FIG. 1B) is then rendered by playback block 130 (FIG. 1A) for delivery to the display 150 (FIG. 1A) as presentable content 140 (FIG. 1A).

Extraction: (Based on Data Retrieval Method PO1 and FIG. 6)

1. The retriever 190 (FIG. 1C), as herein implemented, comprises: an appropriate computer system, such as a standard PC; software and/or hardware capable of operating, according to an embodiment of the invention, in cooperation with the PC for performing the retrieval method; and a suitable video acquisition system, such as those commonly available commercially. The subject content 185 (FIG. 1C) is the presentable content 140 (FIG. 1A) discussed above, and is acquired by the retriever 190 (FIG. 1C). The data retrieval method is implemented in the retriever 190 (FIG. 1C) and performed on the acquired video.

2. The decode module 600 extracts a clear frame each time it is activated.

3. The "last frame" module 605 detects the last frame or end of the file of the acquired presentable content, after which module 610 ends the retrieval operation.

4. The "find the first duplicated frame" module 615 checks if the current frame is identical to the immediately previous frame.

5. To ascertain that the subject content 185 (FIG. 1C) is in fact CCED 180 (FIG. 1B) before attempting to retrieve embedded data 175 (FIG. 1B), the step of checking for a predetermined number of duplicates, y, is performed by module 615 as well. The output of module 615 is "no" until y duplicates are found, at which point the output is "yes", until module 605 stops the retrieval operation. For this example, y is chosen as 10.

6. The "frame counter" module 620 counts the frames that are processed.

7. The "frame counter modulo m" module 625 extracts the $m^{th}$ frame as counted by the frame counter 620. The variable m is a parameter that was defined for the insertion process as discussed above. Since m in this example was defined in units of time, half a second, it is converted to units of frames. Since the video transmitted was PAL MPEG-2 encoded, in this example, a GOP is 480 milliseconds, and there are twelve frames per GOP, therefore 480 milliseconds (the value of m) is equivalent to 12 frames. This $m^{th}$ frame is "frame x," which is checked in block 630.

8. The "frame duplicate detector" module 630 checks if frame x is identical to frame x−1. If it is identical, a "1" bit is added to the extracted data stream 635, alternatively if frame x is not identical to frame x−1, a "0" bit is added to the extracted data stream 640.

9. This process continues with the next frame at bock 600 until the end of file is reached 610. The retrieved data 195 (FIG. 1C) comprises the extracted data stream.

After extraction of the retrieved data 195 (FIG. 1C), regardless of which embodiment of the extraction method is performed, it would be advantageous for the header and check sum added in block 500 to be checked in order to validate the watermark.

In module 625, modulo m is tested. Other embodiments include those in which values other than m, such as integer multiples of m, or other values, are tested. Other values, which can be dynamically changed in a predetermined fashion, include, for example, integer multiples of 12, 15, and 25 times per second.

In module 630, frame x is compared to frame x−1. The value "1" signifies that the sample set frames, and therefore duplicate set frames are adjacent. Other embodiments include values greater than one, for non-adjacent duplicates. The value can be dynamically changed in a predetermined fashion.

Note that in this example, for the sake of simplicity, the variable n, which is the embedding duration, was not checked during the extraction process. Alternative embodiments of the retriever 190 (FIG. 1C) could check for the presence of n as well as other variables, which are selectively included. Such inclusion could be implemented to increase the complexity of the extraction process, and thereby increase the strength of the watermark, or for any other appropriate reason as determined by the implementer, without violating the spirit of the invention, and to equivalent effect.

It is appreciated that software components of the present invention may, if desired, be implemented in ROM (read only memory) form. The software components may, generally, be implemented in hardware, if desired, using conventional techniques. It is further appreciated that the software components may be instantiated, for example: as a computer program product; on a tangible medium; or as a signal interpretable by an appropriate computer.

It is appreciated that various features of the invention which are, for clarity, described in the contexts of separate embodiments may also be provided in combination in a single embodiment. Conversely, various features of the invention which are, for brevity, described in the context of a single embodiment may also be provided separately or in any suitable subcombination.

It will be appreciated by persons skilled in the art that the present invention is not limited by what has been particularly shown and described hereinabove. Rather the scope of the invention is defined by the appended claims and equivalents thereof:

What is claimed is:

1. A method for embedding data in initial content, the initial content comprising synchronized video and audio, the method comprising:
   defining at least one content segment in the initial content; and
   altering the synchronization of the video and audio in the at least one segment in accordance with the data to be embedded, such that the synchronization of the video relative to the audio is altered, thereby producing an altered content segment;
   wherein when the altered content segment is viewed on a viewing device the altered synchronization is imperceptible to a casual viewer.

2. The method according to claim 1, wherein said altering comprises altering the video and audio synchronization by a predetermined amount of time.

3. The method according to claim 1, wherein said defining comprises defining a plurality of content segments in the initial content and said method further comprises repeating said altering for at least an additional one of the plurality of initial content segments.

4. The method according to claim 3, wherein the plurality of defined content segments are contiguous.

5. The method according to claim 3, wherein the plurality of defined content segments are not contiguous.

6. The method according to claim 5, wherein the not contiguous plurality of defined content segments are separated by predetermined intervals.

7. The method according to claim 2, wherein said altering comprises one of:
   altering the video and audio synchronization by a first predetermined amount to embed a first data value in one of the plurality of defined content segments; and
   altering the video and audio synchronization by a second predetermined amount to embed a second data value in one of the plurality of defined content segments.

8. The method according to claim 7, wherein the first data value is a zero and the second data value is a one.

9. The method according to claim 7, wherein one of the first and second predetermined amounts is zero.

10. The method according to claim 1, wherein the altered video and audio synchronization is reset in at least one predetermined location in the at least one altered content segment.

11. The method according to claim 10, wherein the at least one predetermined location comprises at least one of the beginning or the end of a group of pictures (GOP).

12. The method according to claim 10, wherein the at least one predetermined location comprises at least one of the beginning or the end of the defined content segment.

13. The method according to claim 1, wherein said altering the video and audio synchronization comprises at least one of:
   advancing the audio relative to the video;
   advancing the video relative to the audio;
   delaying the audio relative to the video; and
   delaying the video relative to the audio.

14. The method according to claim 1, wherein the initial content comprises video and audio time stamps, and altering the video and audio synchronization comprises at least one of:
   altering an audio time stamp; and
   altering a video time stamp.

15. The method according to claim 1, wherein the initial content comprises audio frames and video frames, and said altering the video and audio synchronization comprises at least one of:
   dropping an audio frame;
   dropping a video frame;
   substituting an audio frame with an alternative audio frame;
   substituting a video frame with an alternative video frame;
   adding an audio frame; and
   adding a video frame.

16. The method according to claim 1, wherein the initial content comprises compressed content.

17. The method according to claim 16, wherein the compressed content comprises content encoded according to one of the following encoding standards: MPEG-1; MPEG-2; MPEG-4; VC-1; H.263; and H.264.

18. The method according to claim 1, wherein the data comprises a watermark.

19. The method according to claim 1, wherein the data comprises information relating to at least one of a content producer, a content owner, a content distributor, geographic location, a date, a time, subscription related information, geographic targeting of the content, a Consumer Premises Equipment (CPE) serial number, a CPE user Identification (ID), a smartcard serial number, a smartcard user ID, a subscriber ID, a customer ID, and subscriber information.

20. A method for retrieving data from subject content, the subject content comprising Content Containing Embedded Data (CCED) comprising data embedded in initial content, the method comprising:
   sampling at a known location in the subject content, thereby producing a subject content sample;
   sampling at a location in the initial content corresponding to the known location in the subject content, thereby producing a corresponding initial content sample, or sampling at a further location of the content sample to produce two samples comprising a sample set;
   comparing the subject content sample to one of, the corresponding initial content sample and the sample from the further location of the subject content;
   detecting, based at least partially on said comparing, audio and video synchronization changes in the subject content relative to the initial content, wherein the change detected is an alteration of the synchronization of the video relative to the audio; and
   assigning an embedded data value to the detected change in synchronization.

21. The method according to claim 20, wherein said sampling is repeatedly performed at predetermined intervals.

22. The method according to claim 20, wherein said sampling is repeatedly performed at predetermined variable intervals.

23. The method according to claim 20, said method further comprising:
    determining at least one interval between a later detected change and an earlier detected change;
    disregarding at least one of the earlier detected change and the later detected change when the determined at least one interval is not equal to an expected interval.

24. The method according to claim 23, wherein the expected interval is predeterminedly variable.

25. The method according to claim 23, wherein the expected interval is fixed.

26. A method according to claim 20, the method further comprising:
    sampling the subject content at least twice, the at least two samples comprising a sample set; and
    detecting the presence of at least one sample in the sample set which is a duplicate sample of at least one other sample in the sample set, the detected presence of the at least one duplicate sample signifying an embedded data value, wherein the at least one duplicate sample and the at least one other sample form a duplicate set.

27. The method according to claim 26, wherein the at least one other sample is adjacent to the at least one duplicate sample.

28. The method according to claim 26, wherein said sampling the subject content at least twice is performed at a first predetermined interval.

29. The method according to claim 26, wherein said sampling the subject content at least twice is repeatedly performed at a second predetermined interval thus creating a plurality of sample sets.

30. The method according to claim 29, wherein the second predetermined sampling interval varies.

31. The method according to claim 29, said method further comprising:
    determining at least one interval between a later detected duplicate set and an earlier detected duplicate set;
    disregarding at least one of the earlier and later detected duplicate sets when the determined at least one interval is not equal to an expected interval.

32. The method according to claim 31, wherein the expected interval is predeterminedly variable.

33. The method according to claim 31, wherein the at least one duplicate sample of the at least one other sample in the sample set comprising duplicated video signifies an embedded data value.

34. The method according to claim 33, wherein the at least one duplicate sample of the at least one other sample in the sample set comprising duplicated audio and video invalidates the embedded value.

35. Apparatus for embedding data in initial content, the initial content comprising synchronized video and audio, the apparatus comprising:
    an embedder operative to define at least one content segment in the initial content, and further operative to alter the synchronization of the video and audio in the at least one segment in accordance with the data to be embedded, such that the synchronization of the video relative to the audio is altered, thereby producing an altered content segment;
    wherein the altered content segment is viewable on a viewing device and the altered synchronization is imperceptible to a casual viewer.

36. The apparatus according to claim 35, wherein the initial content comprises video and audio time stamps, and altering the video and audio synchronization comprises at least one of:
    altering an audio time stamp; and
    altering a video time stamp.

37. The apparatus according to claim 35, wherein the initial content comprises audio frames and video frames, and said altering the video and audio synchronization comprises at least one of:
    dropping an audio frame;
    dropping a video frame;
    substituting an audio frame with an alternative audio frame;
    substituting a video frame with an alternative video frame;
    adding an audio frame; and
    adding a video frame.

38. The apparatus according to claim 37, wherein said adding an audio frame comprises adding an audio frame that is a duplicate of an adjacent audio frame, and said adding a video frame comprises adding a video frame that is a duplicate of an adjacent video frame.

39. The apparatus according to claim 35, wherein the initial content comprises compressed content.

40. Apparatus for retrieving data embedded in subject content, the subject content comprising Content Containing Embedded Data (CCED), the subject content further being identified as corresponding to initial content, the apparatus comprising:
    a sampler operative to sample at a known location in the subject content, thereby producing a subject content sample, the sampler further operative to perform one of sample at a location in the initial content corresponding to the known location in the subject content, thereby producing a corresponding initial content sample; and sample at a further location of the content sample to produce two samples comprising a sample set;
    a comparator operative to compare the subject content sample to one of, the corresponding initial content sample and the sample from the further location of the subject content; and
    a detector, operatively associated with said comparator, operative to detect audio and video synchronization changes in the subject content relative to the initial content, wherein said changes are changes to the synchronization of the video relative to the audio, and signify an embedded data value.

41. Apparatus according to claim 40, further comprising:
    a sampler operative to sample the subject content at least twice, the at least two samples comprising a sample set; and
    a detector operative to detect the presence of at least one sample in the sample set which is a duplicate sample of at least one other sample in the sample set, the detected presence of the at least one duplicate sample signifying an embedded data value, wherein the at least one duplicate sample and the at least one other sample form a duplicate set.

42. The apparatus according to claim 41, wherein the at least one other sample is adjacent to the at least one duplicate sample.

43. The apparatus according to claim 41, wherein said sampling the subject content at least twice is performed at a first predetermined interval.

44. The apparatus according to claim 41, wherein said sampler is further operative to sample the subject content at least twice repeatedly at a second predetermined interval thus creating a plurality of sample sets.

45. The apparatus according to claim 44, wherein the second predetermined sampling interval varies.

46. The apparatus according to claim 44, wherein said detector is further operative to determine at least one interval between a later detected duplicate set and an earlier detected duplicate set, and to disregard at least one of the earlier and later detected duplicate sets when the determined at least one interval is not equal to an expected interval.

47. The apparatus according to claim 46, wherein the expected interval is variable.

48. The apparatus according to claim 46, wherein the expected interval is fixed.

49. The apparatus according to claim 41, wherein said subject content comprises video and audio content, and the at least one duplicate sample of at the least one other sample in the sample set comprises at least one of: duplicated video; duplicated audio; and duplicated audio and video.

50. The apparatus according to claim 49, wherein the at least one duplicate sample of at the least one other sample in the sample set comprising duplicated video signifies an embedded data value.

51. The apparatus according to claim 50, wherein the at least one duplicate sample of at the least one other sample in the sample set comprising duplicated audio and video invalidates the embedded value.

* * * * *

UNITED STATES PATENT AND TRADEMARK OFFICE
CERTIFICATE OF CORRECTION

PATENT NO.       : 8,644,377 B2
APPLICATION NO.  : 12/736473
DATED            : February 4, 2014
INVENTOR(S)      : Eyal Farkash It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 568 days.

Signed and Sealed this

Twenty-ninth Day of September, 2015

Michelle K. Lee
*Director of the United States Patent and Trademark Office*